United States Patent [19]

Seidel et al.

[11] Patent Number: 5,884,082
[45] Date of Patent: Mar. 16, 1999

[54] METHOD FOR MONITORING A DIGITAL MULTIPROCESSOR

[75] Inventors: Kurt Dieter Seidel, Bridewater; Allen Wilbur Stichter, Flemington, both of N.J.

[73] Assignee: Lucent Technologies Inc., Murray Hill, N.J.

[21] Appl. No.: 822,955

[22] Filed: Mar. 21, 1997

Related U.S. Application Data

[63] Continuation of Ser. No. 444,635, May 19, 1995, abandoned.

[51] Int. Cl.$^6$ .................................................. G06F 9/45
[52] U.S. Cl. ............................................................ 395/704
[58] Field of Search ................................................ 395/704

[56] References Cited

U.S. PATENT DOCUMENTS

| | | | |
|---|---|---|---|
| 5,047,919 | 9/1991 | Sterling et al. ................. | 395/184.01 |
| 5,179,702 | 1/1993 | Spix et al. ....................... | 395/650 |
| 5,257,372 | 10/1993 | Furtney et al. ................. | 395/650 |
| 5,349,658 | 9/1994 | O'Rourke et al. ............... | 395/700 |
| 5,386,360 | 1/1995 | Wilson et al. ................... | 365/146 |
| 5,450,586 | 9/1995 | Kuzara et al. .................. | 395/700 |
| 5,465,363 | 11/1995 | Orton et al. .................... | 395/700 |
| 5,485,574 | 1/1996 | Bolosky et al. ................ | 395/183.11 |

OTHER PUBLICATIONS

A.J. Goldeberg and John L. Hennessy, "Mtool: An Integrated System for Performance Debugging Shared Memory Multiprocessor Applications," IEEE Transactions on Parallel and Distributed Systems, vol. 4, No. 1, Jan. 1993, pp. 28–40.

CASEVision/Workshop User's Guide, Silicon Graphics.

*Primary Examiner*—James P. Trammell
*Assistant Examiner*—Peter J. Corcoran, III
*Attorney, Agent, or Firm*—Martin I. Finston

[57] ABSTRACT

An operating system monitoring tool has two components: a hyperkernel that augments the operating system of a target multiprocessing system; and a graphical front end for implementing the user interface. The hyperkernel component is annexed to the operating system by: intercepting all interrupts and redirecting them from the operating system to the hyperkernel; and substituting a jump to the hyperkernel for each point in the operating system that returns back to the application code. Associated with the hyperkernel are buffers, located on the respective processors, that accumulate information pertaining to calls to the operating system. On demand, or when the buffers fill, the accumulated information is relayed to the graphical front end for filtering, manipulation, and display.

1 Claim, 5 Drawing Sheets

METHOD FOR MONITORING A DIGITAL MULTIPROCESSOR

This application is a division of application Ser. No. 08/444,635, filed on May 19, 1995, now abandoned.

GOVERNMENT CONTRACT

This invention was made with Government support under Subcontract 646581 of Prime Contract N000383-91-G-M601. The government has certain rights in this invention.

FIELD OF THE INVENTION

This invention relates to software tools that help computer programmers optimize their programs by keeping track of certain aspects of the execution of computer programs. More particularly, the invention relates to software tools that monitor calls made to the operating system during the execution of code by multiprocessing systems.

ART BACKGROUND

Multiprocessor architectures are attracting growing attention as a design approach for making computer systems faster. However, it is difficult for human programmers of multiprocessor systems to keep track of the execution of their programs. Moreover, it is generally desirable to practice multithreading of the computer programs, in order to take maximum advantage of the parallel architecture. However, the gain in speed potentially achievable through multithreading is at least partially set off by the increased Operating System (OS) overhead incurred by the multithreading setup. Thus, a judgment needs to be made as to when, and at what granularity, multithreading will be worthwhile. There is a need for a software development tool that will help the programmer make such a judgment, by, e.g., keeping track of calls to the OS made by the program, and by gathering statistics that describe the execution of the program on the multiprocessor system. (A program intended to perform an external task will hereafter be referred to as an "application".)

In fact, certain software development tools, known as "profiling tools," are commercially available. These tools add some form of instrumentation, such as counters, to the executable code for measuring or estimating the number of times each basic block of code is executed. Under the assumption that cpu time is allocated with perfect efficiency, these measurements or estimates can be used to infer the amounts of time spent executing various parts of the code. However, the assumptions that underlie the use of these tools are seldom fully justified. Moreover, these tools achieve a resolution of several milliseconds, which is not fine enough for many code optimization problems. Still further, these tools provide no cross-processor coverage, and they provide only limited cross-process coverage.

Also available commercially are analysis tools that can show the user the percentages of time spent in user mode, system mode, and idle time. However, tools of this kind do not reveal how or where (i.e., in which calls to the OS) the application is spending its time when it is in system mode. These tools also fail to provide a comprehensive view of what is occurring, within a given time window, in all of the various processors at once.

SUMMARY OF THE INVENTION

We have invented an operating system monitoring tool, which we refer to as "Osmon," that can provide the user with timeline displays of process execution and use of the OS, and statistical analyses (summarized, e.g., in histogram displays) of calls to the OS. This information enables the user to concentrate his efforts to optimize the execution time on that component represented by OS time. Our monitoring tool can also offer sub-microsecond resolution for displayed data, including the execution time between user-selected points embedded in, and compiled into, the application code.

The inventive tool has two components: (a) a hyperkernel that augments the operating system of the target multiprocessing system; and (b) a graphical front end for implementing the user interface.

The front end initiates the collection of data from the target multiprocessor system, receives the resulting files of raw data, and performs whatever filtering of data is necessary to generate user-requested displays. The time windows within which data are collected can be defined in two ways, referred to herein as the "immediate mode" and the "software-triggered mode."

In the immediate mode, the data are collected immediately upon request. This permits general analysis at randomly selected points in the program execution. For displays that are based on statistical summaries (i.e., the percentages of time spent in various services provided by the OS), the user may select the number of "data snapshots" that are to be automatically collected and incorporated in the display. (A data snapshot is a sample from a specified time window.) To use the software-triggered mode, the programmer embeds specific library calls at selected points in the code. The process of data collection starts and stops, as indicated, at these points. Multiple starts and stops are permitted. The software-triggered mode makes it possible for the user to examine the internal details of program execution at specific points of interest in the program. This mode also permits precision timing measurements to be made between specified points in the code. This is particularly useful for multithreading tradeoff analysis.

The hyperkernel component is annexed to the OS by: (a) intercepting all interrupts and re-directing them from the OS to the hyperkernel; and (b) substituting a jump to the hyperkernel for each point in the OS that returns back to the application code. The first of these makes it possible to control entry into the OS, and the second makes it possible to control egress from the OS.

Upon a signal from the front end, the hyperkernel is activated, and all entrance and exit times are recorded, together with the reason for the interrupt. This is done on all processors, with a synchronized time.

DETAILED DESCRIPTION

Figure 1:
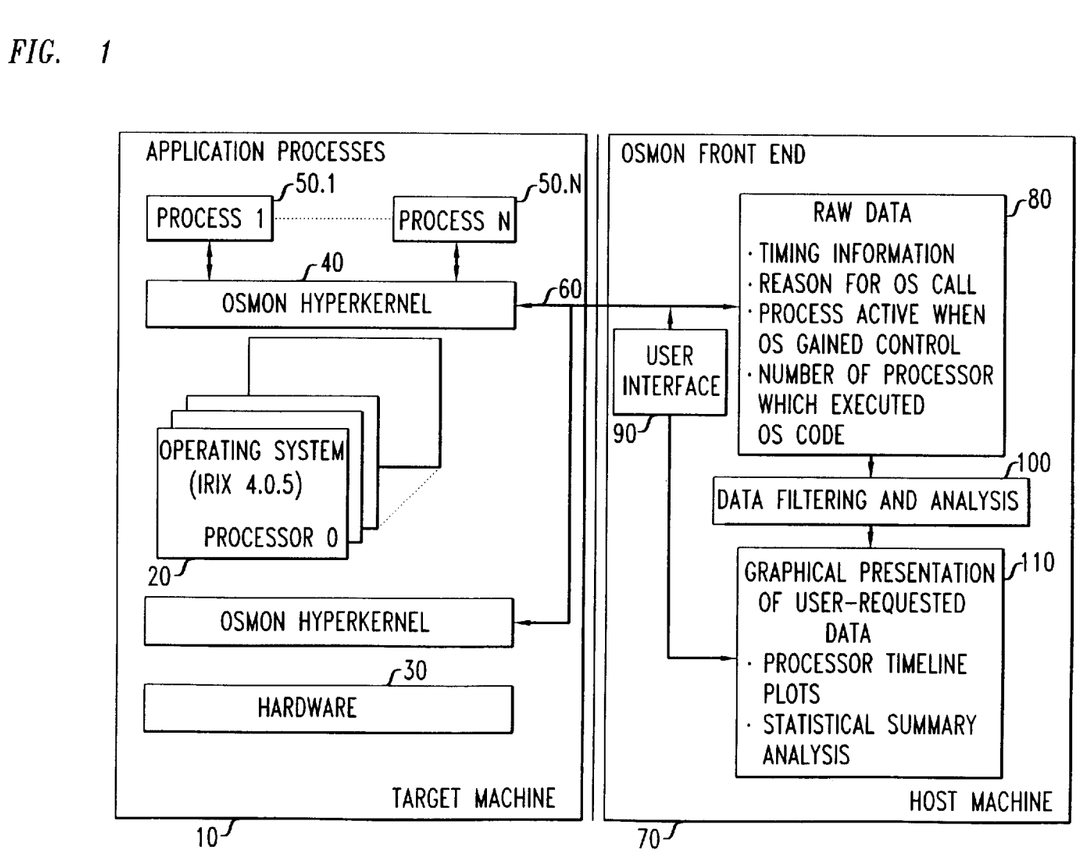
FIG. 1 is a schematic representation of the architecture of the inventive operating-system-monitoring tool in an illustrative embodiment.

The architecture of a currently preferred embodiment of the invention is now described with reference to FIG. 1. Although the invention is useful in connection with uniprocessors, it will be especially useful in connection with multiprocessing systems. Accordingly, the exemplary embodiment described here involves a target multiprocessing system 10. The target multiprocessing system 10 is exemplarily of an R3000-based SGI Power Series system. The operating system is exemplarily IRIX 4.0.5. As shown, there is one instance of the OS for each of the plural processors. Component 30, labeled "HARDWARE" in the figure, includes I/O and communication devices. Hyperkernel 40 communicates with each of the n application processes 50.1, . . . , 50.n running on the target system. Represented by double-headed arrow 60 is bidirectional communication between the hyperkernel and front end 70.

Raw data are passed from the hyperkernel buffers located on respective processors (not shown) to front-end data files 80. These files typically reside on a disk drive which is part of the normal user file system on the target multiprocessor. This flow of data may be mediated by user interface 90, which, among other things, issues requests for immediate-mode data. The raw data consist of: timing information (our current system has 62.5-ns time resolution); the reason for each system call; the identity of the process active at the point when the OS gained control; and the identification number of the processor that executed the OS code.

Within the front end, the raw data are filtered and analyzed (at block 100 in the figure) in preparation for graphical presentation (at block 110) in accordance with requests made via the user interface. The graphical information that is presented includes, by way of example: timeline plots of active processes and executed system calls; histograms identifying those system calls in which the OS spends the most time; statistical summaries over any number of data sets (each such set is sampled during a discrete time window and delivered to the front end either dynamically or from a saved file); and detailed statistical data on system calls, including the number of occurrences and the average execution time per occurrence.

The process of display generation is triggered by a request from the user by way, for example, of a menu selection. This causes a control message to be sent to the target multiprocessing system, instructing it to start the hyperkernel. When the hyperkernel's data collection buffers fill, or when (in software-triggered mode) an embedded "END" trigger is encountered, the raw data file is sent to the requesting host machine.

The data are treated on a processor-by-processor basis. That is, the information pertaining to processor 0 is the first to be extracted, filtered, analyzed, and displayed. Then, this treatment is applied to processor 1, and in turn, to each of the succeeding processors. The raw data file includes information regarding how many processors are associated with the given data. In our current embodiment, the display object provides a C++ interface around the raw data file. This enables all of the desired information to be extracted via member function calls, and it eliminates the need to know detailed information on the formatting of the data in this file. (A "display object" is an abstract data type familiar to C++ programmers. C++ "objects" are discussed, generally, in S. Lippman, C++ Primer, 2d Ed., Addison-Wesley, Reading, Mass., 1991.)

To generate timelines of the active processes, the filtering component of the front end excludes all OS events obtained by the hyperkernel, except those indicating that a change of context has taken place in the processor of current interest. A context change is indicated whenever the Process ID associated with the next event in the data (for the current processor) is different from the Process ID associated with the event that precedes it. When such a new Process ID is received, the start time of the new process is saved, and the end time of the previous process is saved. From the saved timestamps that mark the beginning and end of a given process, it is possible to create a box, graphically displayed as part of the timeline of the relevant processor, that begins and ends at the saved start and stop times. By way of example, we are currently implementing the front end using the OI (class library) toolkit, and each plotted box in this implementation is actually an OI box object.

This method for recognizing context changes and generating timelines will work well only if some process is always occupying the processor, since the method assumes that the beginning of a new process always corresponds to the ending of a previous process. In order to satisfy this condition, the hyperkernel initiates dummy, lowest priority, null tasks when it starts up. These null tasks insure that some process is always available to take the processor. The Process IDs of these null tasks are also included in the raw data file. However, the front end does not display boxes associated with these tasks, since they actually represent idle time.

The method for generating timelines of the executed system calls is similar to the method, described above, for generating timelines of the active processes. However, for system-call timelines, the only data that pass through the filtering stage are the system-call entry events and exit events. When a system-call entry is encountered, it is added to a list. These events need to be queued in a list because it is possible for multiple, nested system calls to occur in the course of handling the original, user-code-initiated OS service call. When an exit event is received, the most recent system-call event having the same Process ID is popped off the list and matched to it. A box can then be displayed on the appropriate timeline, spanning the times corresponding to the entry and exit events that have been paired in this manner.

The procedure for generating summary histogram plots of the system calls is similar to the procedure, described above, for generating timelines of the executed system calls. However, the beginning and end of a given system call are not displayed on a timeline. Instead, once these events have been encountered, relevant details such as execution time and pend time are added to a stored record of that system call. After all the data in the data file (or files) haves been processed, the data in these stored records are summarized, averaged over the number of occurrences of each system call, and plotted in an appropriate display. To create the graphically displayed histogram, one box is drawn for each type of system call encountered in the data file (or files). The length of each of these boxes is drawn proportional to the amount of processor time taken up by the corresponding system call, expressed as a percentage of the total processor time cumulatively taken up by all the system calls.

Example

Our current implementation is hosted on a SUN4 workstation running X Windows. The target multiprocessor is an SGI R3000 Power Series system running IRIX 4.0.5. Before running the inventive tool, the host environment is set up such that $EWPETOOLS is pointing to the EWPTOOLS installation directory. The SUN4 executables are placed in the user's path by adding the following to the dot profile on the SUN4 workstation (assuming the installation directory is /t/ewpetools):

EWPETOOLS=/t/ewpetools
export EWPETOOLS
PATH=$PATH:$EWPETOOLS/sun4/bin export PATH
The monitoring tool is invoked by name at the UNIX prompt.

For acquiring a snapshot of realtime operating system data, the identity of the target processor, the buffer size for the data collected from that processor, and the type of trigger mode desired are specified by the user. The collected data set automatically becomes the current data set upon which all analyses will be performed.

For software-triggered data collection, start, stop, and end triggers are embedded in the application code. Start begins data collection, stop stops data collection, and end closes the data-collection process and forces the contents of the data buffers to be sent to the host machine, irrespective of whether these buffers have filled. (Data collection will also automatically end when the data buffers fill.)

To embed trigger points in a C application code, the user must:

1) include $EWPETOOLS/sgi/include/OSMonitorT.hh;
2) link with $EWPETOOLS/sgi/lib/libObjects.a; and
3) insert the following function calls at the selected trigger points in the code:
   OSMonitorT_c StartTriggero();
   OSMonitorT_c StopTriggero();
   OSMonitorT_c EndTriggero().

To embed trigger points in C++ code, the user must perform (1) and (2), above, and then: 4) create an object of class OSMonitorT_c; and 5) invoke the following member functions at selected points in the code:

Start();
Stop();
End().

Figure 2:
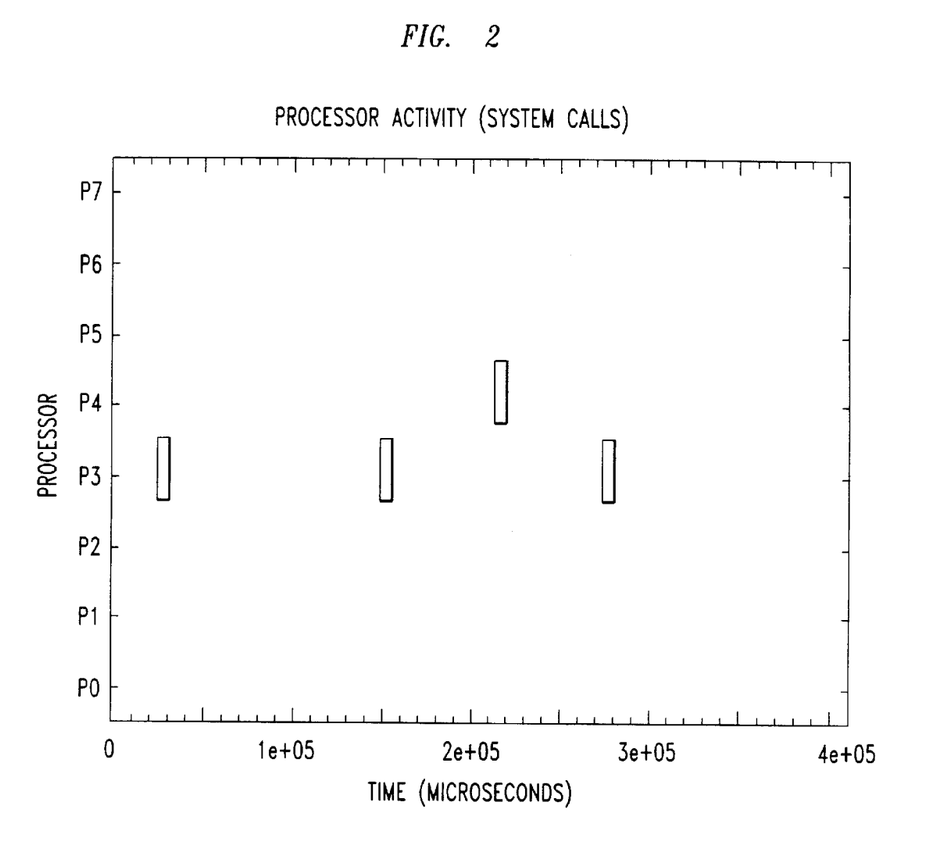
FIGS. 2–5 are illustrative frames of data displays generated by a current implementation of the inventive monitoring tool.
Figure 3:
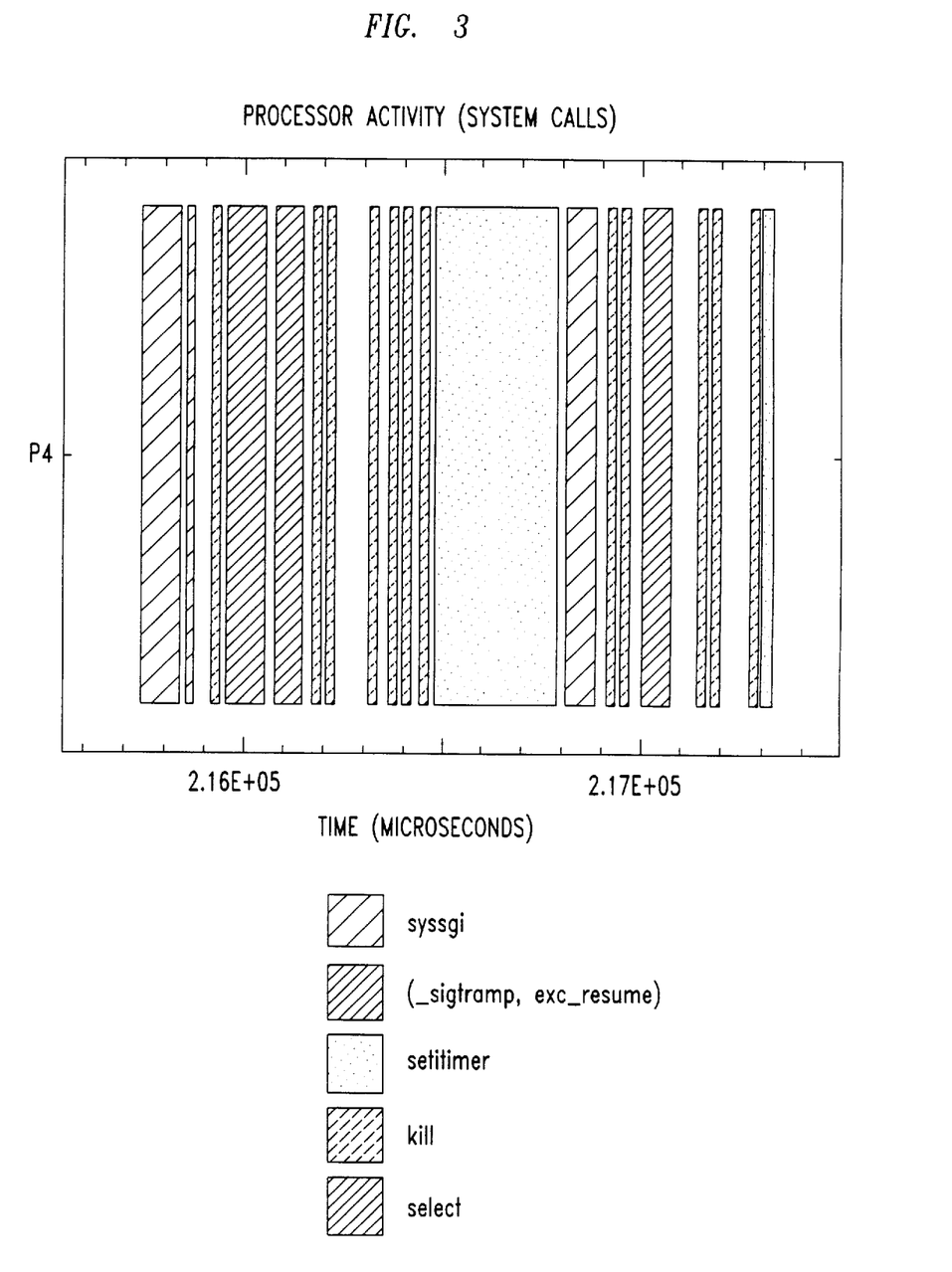
Figure 4:
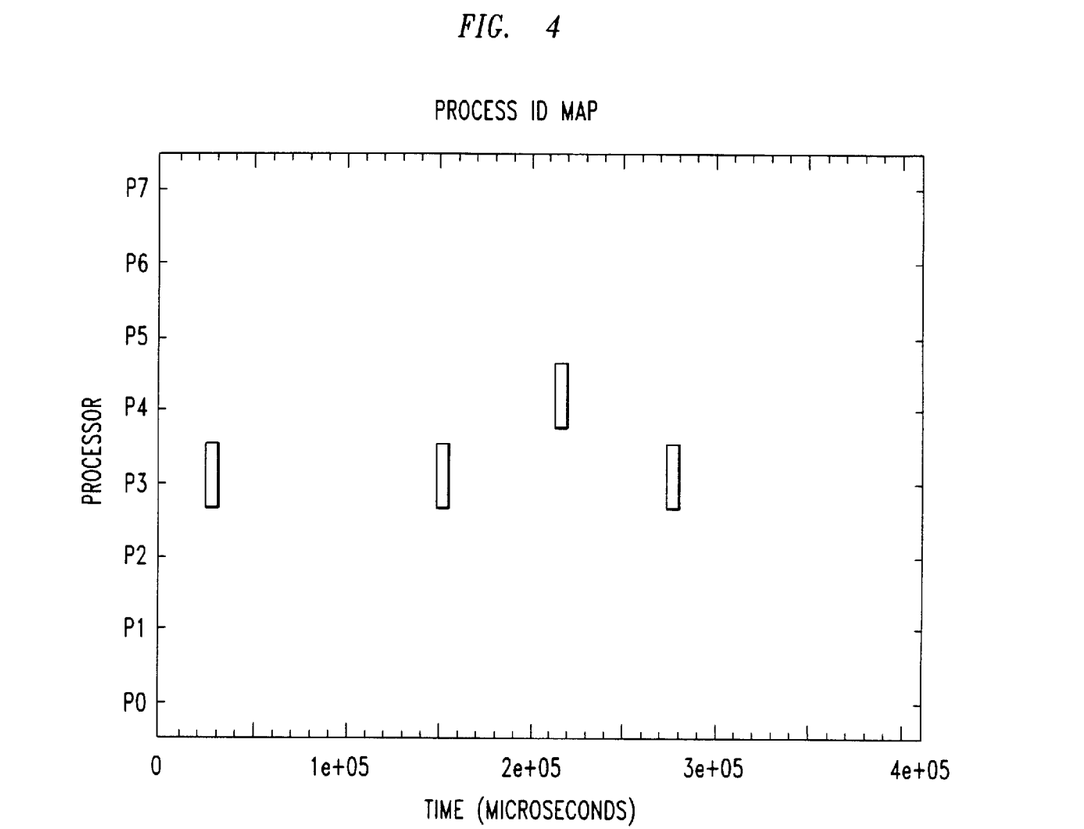
Figure 5:
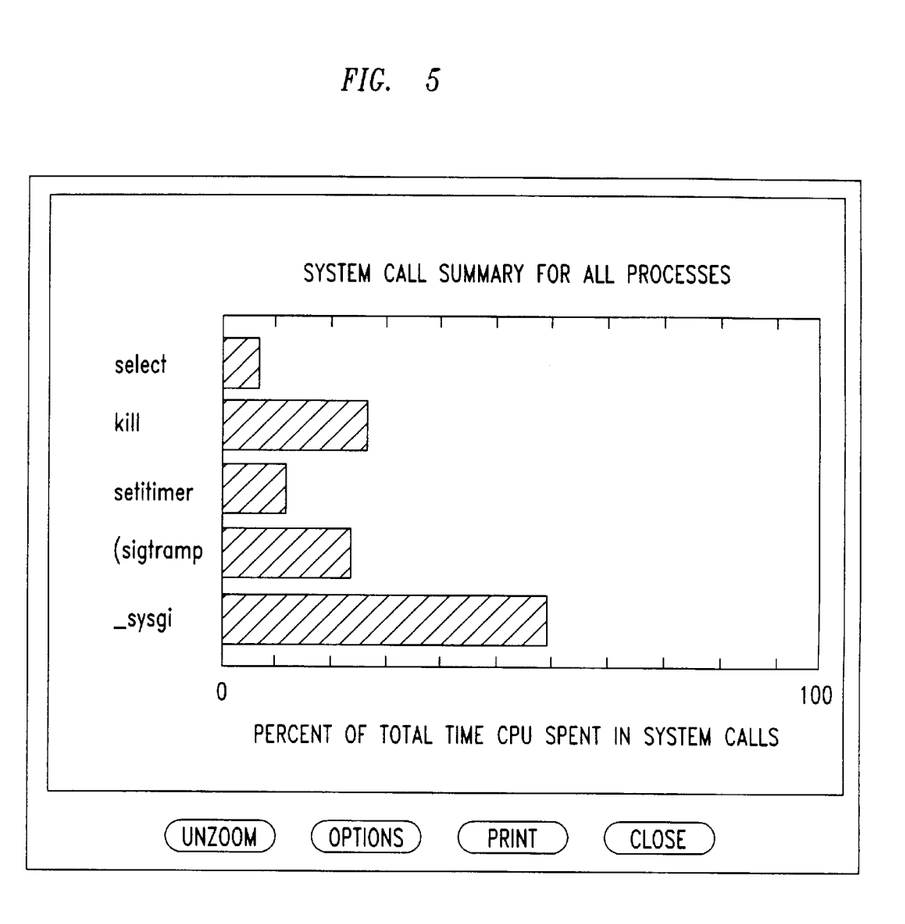

A timeline trace of system calls is shown in FIG. 2. A zoomed-in view of the timeline for a particular processor is shown in FIG. 3. A Process ID map, which is a timeline trace of all processes encountered, on a per-processor basis, is shown in FIG. 8. A histogram summary of system-call CPU usage is shown in FIG. 5.

The data that can be requested for each system call include the total time for that system call, the total time for all system calls, the average time per occurrence, and the percent of total time. Both "wall time" and "cpu time" can be requested. Wall time is the total time between entry and exit of the system call, and includes any pend time in which the processor can be given up to do other work. Cpu time is the total time during which the system call is using the cpu.

Osmon Installation Procedure

We now describe our procedures for installing the hyperkernel component of Osmon. First, we modify the IRIX operating system for supporting the hyperkernel component. Then, we install a software tool referred to as the "Hyperkernel Tool". The Hyperkernel Tool provides symmetric multiprocessing control, and controls the installation of auxiliary software tools.

Under the control of the Hyperkernel Tool, we then install a software tool referred to as the "OSMonitor Tool". The OSMonitor Tool runs on all processors of the multiprocessing system. As noted, we are currently using eight processors (numbered 0–7), but our software tools are designed for use with any number of processors. The OSMonitor Tool records, for each processor, the time at which each interrupt occurs, the cause of the interrupt, and the process-identifier of the interrupted process. The OSMonitor Tool also records the time and current Process-ID whenever the operating system exits. (By "exiting" is meant that processor control is leaving the operating system to return to an application.) All of these time notations are referred to a common hardware oscillator running at a 62.5-ns resolution. Finally, the OSMonitor Tool passes the collected data to the front end of Osmon.

This installation procedure involves adding code to, and removing code from, individual processors of a multiprocessor system. As a consequence, there is a danger that each processor might execute old or stale instructions. As discussed in detail below, the bipartite division of Osmon into the Hyperkernel Tool and the OSMonitor Tool is helpful for avoiding this danger. That is, the HyperKernel Tool is designed to install and remove code from each processor without interfering with the operation of the other processors until it is time for them to execute the new code. Moreover, when the OSMonitor Tool is finished with its task (for the time being), it reports to the application that invoked it, and then it removes itself from the instruction cache of the processor. This prevents the system from leaving behind potentially troublesome remnants of old code.

To modify the operating system, we first create a buffer, within the operating system image, to be used by the Hyperkernel Tool. We name this buffer 'RTEIRIXBuffer', and store its size at the label 'RTEIRIXBufferSize'. This modification is achieved with the following script, followed by re-booting of the operating system:

| | |
|---|---|
| su root | Need to have root access to sysgen |
| cd/usr/sysgen/master.d | Get to proper directory |
| cp kernel kernel.old | Save old kernel version |
| cat >> kernel | Copy the next 3 lines to the end of 'kernel' |
| long RTEIRIXBuffer [0x4000]; | |
| enum { RTEIRIXBufferSize = size of (RTEIRIXBuffer) }; | |
| ^D | |

The Hyperkernel Tool is installed in the running IRIX operating system by a program that includes the following modules:

| | |
|---|---|
| Install.cc | (The main routine; i.e., the command interface.) |
| HyperKernelI.hh | (The header file for the installation procedure.) |
| HyperKernelI.cc | (The installation procedure.) |
| HyperKernelI.s | (The code that runs along with IRIX.) |
| FlushICache.hh | (Provides linkage information for flushing the instruction caches.) |
| FlushICache.s | (Provides implementation of flushing of the instruction caches.) |
| KMem.hh | (Provides linkage information for kernel-memory accesses.) |
| KMem.cc | (Provides implementation of kernel-memory accesses.) |

Table 1 is provided as an aid to understanding the role of these modules within the installation program.

To install the Hyperkernel Tool, the functions in file HyperKernelI.cc first look up 'RTEIRIXBuffer' and 'RTEIRIXBufferSize' in the symbol table for the running operating system. (This table is in an operating system file named '/unix'.) The functions in file HyperKernelI.cc then copy the hyperkernel code that subsists in file HyperKernelI.s into kernel memory at the address 'RTEIRIXBuffer'. All position-independent references in this code are changed appropriately.

The functions in file HyperKernelI.cc then flush the instruction caches to remove any stale code, install the jump instruction that will cause the IRIX operating system to call the Hyperkernel Tool, and flush the instruction caches using the functions contained in the file HyperKernelI.s to make all the processors load the jump instruction.

As a result of this installation procedure, the functions in the file HyperKernelI.s will be called when the next interrupt occurs on each processor. Thus, this code will be executed on each of eight separate occasions, one for each processor. When this code is executed, it will set aside memory for each processor, and will also set aside a common memory area for sharing of information between processors.

As noted, there is a danger that each processor might execute old or stale instructions. To prevent this, we have included barrier points at which the operation of each processor is suspended after it has completed its respective hyperkernel initialization procedure. Processing resumes when each processor receives a "go ahead" signal from processor 0 (the master processor). This signal is passed to each processor by way of a programming device known as a "spin lock."

After each processor completes the Hyperkernel initialization, processor 0 (the master processor) scans through the IRIX operating system and finds sequences of instructions indicating that the operating system is exiting. Each of these code sequences is replaced with a jump to the Hyperkernel Tool. This makes it possible to invoke our new code both when the operating system exits, and when it is entered.

After the master processor has completed this task, it passes the "go ahead" signal to the other seven processors. This assures that no individual processor will enter the operating system prematurely.

After all of these initialization procedures have been completed, the master processor sets each of the processors to await an interrupt that will instruct it to install the code for the OSMonitor Tool. (The code to be installed is read from a file denoted HyperKernelC.s). This particular interrupt is generated by way of a "break" instruction to the multiprocessing system. (Any interrupt other than the reception of this special "break" instruction is handled by the IRIX operating system.) This completes the installation of the Hyperkernel Tool.

The Hyperkernel Tool needs to be re-installed each time the system is re-booted.

Our program for installing and running the OSMonitor Tool is referred to as "osm." As illustrated schematically in Table 2, this program comprises seven modules:

| | |
|---|---|
| osm.cc | (The main routine.) |
| OSMonitor.hh | (The header file for the monitoring facility.) |
| OSMonitor.cc | (The code for the monitoring facility, referred to as the "client".) |
| OSMonitor.s | (The code that carries out the actual monitoring tasks. Formally, this module is a client of the hyperkernel, and a server to osm.cc.) |
| HyperKernelC.hh | (The header file for the client installation procedure.) |
| HyperKernelC.cc | (The client installation procedure.) |
| HyperKernelC.s | (The code that runs along with the IRIX operating system to install the client.) |

To install the OSMonitor Tool the instructions in the file osm.cc first create a null process to run on each of the processors. The priority of these null processes is set to the least possible value, so that these processes will run only when the processors have no other tasks. As noted, above, these null processes are used to indicate when a given processor is idle.

The instructions in the file osm.cc then allocate buffers for the logging of data, and lock these buffers into memory to prevent the IRIX operating system from swapping them out to disk without the user's knowledge. The instructions in the file osm.cc will appropriately change any position-independent references in the code contained in the files OSMonitor.s and HyperKernelC.s. Upon triggering by means of the "break" instruction, the Hyperkernel Tool will install the OSMonitor Tool (as represented by the code contained in the files OSMonitor.s and HyperKernelC.s) into kernel memory.

In operation, the OSMonitor Tool will now convert the address of each data-logging buffer from user mode to kernel mode, and it will divide the allocated buffer memory space evenly among the eight processors. The OSMonitor Tool will then be able to run, simultaneously and asynchronously, on all eight processors.

At this point, there are nine separate control paths. As noted, the OSMonitor Tool is running on eight processors. In addition, the osm program checks periodically (once each second, in our current implementation) to determine whether the OSMonitor drivers (represented by the code in files OSMonitor.s and HyperKernelC.s) are finished. If they are not finished, the osm program relinquishes control of the processor for one second, and then tries again.

The event that determines when the OSMonitor drivers are finished is the filling of the first buffer. That is, the first of the eight processors to fill its buffer will then stop monitoring, and will also signal each of the the other processors to stop monitoring.

Upon receiving this signal, each processor individually disables the monitor.

The osm program (i.e., the code in file osm.cc) then unlocks the memory and compresses the data that have been recorded, saves the process identifiers of the null tasks, and passes the data to the front end or, optionally, to a binary disk file.

With reference to Table 3, OS Display is a utility package which provides the interface to the disk files and displays information generated by OSMonitor. In our current implementation, it is a UNIX® application code. (It does not run under the hyperkernel.)

TABLE 1

The install routine: To install the hyperkernel into kernel memory

| File: Hyperkernel/Hyperkernell.s<br>Purpose: The Hyperkernel kernel code. | File: Hyperkernel/Install.cc<br>Purpose: Provide user interface to install Hyperkernel |
|---|---|
| Include File:<br>HyperKernel/HyperKernel.h<br>Purpose: The hyperkernel common definitions for assembler routines. | Include File: RTETypes.hh<br>Purpose: Provide common definitions |
| | Include File: HyperKernelI.hh<br>Purpose: Provide linkage information for HyperKernel installation object. |

TABLE 1-continued

The install routine: To install the hyperkernel into kernel memory

File: FlushICache/FlushICache.s
Purpose: Provide implementation of instruction cache flushing.

File: KMem/KMem.cc
Purpose: Provide implementation of kernel accesses.
- Include File: RTETypes.hh
- Include File: KMem.hh File: Hyperkernel/HyperKernelI.cc
Purpose: Provide implementation of Hyperkernel Installation object
- Include File: RTETypes.hh
- Include File: FlushICache.hh
  Purpose: Provide linkage information for instruction cashe flushing.
- Include File: HyperKernel/HyperKernelI.hh
- Include File: KMem.hh
  Purpose: Provide linkage information for kernel memory accesses.

TABLE 2 osm: The OS Monitor

File: OSMonitor/osm.cc
Purpose: Provide user interface to monitor OS.
- Include File: OSMonitor.hh
  Purpose: Provide linkage information for OS monitor File: OSMonitor/OSMonitor.cc
Purpose: Provide implementation of OS monitor.
- Include File: RTETypes.hh
- Include file: HyperKernelC.hh
- Include file: OSMonitor.hh File: OSMonitor/OSMonitor.s
Purpose: The OS monitor kernel code.
- Include File: HyperKernel/HyperKernel.h File: HyperKernel/HyperKernelC.cc
Purpose: Provide implmentation for HyperKernel client object.
- Include File: RTETypes.hh
- Include file: HyperKernelC.hh File: HyperKernel/HyperKernelC.s
Purpose: The HyperKernel client kernel code.
- Include File: HyperKernel/HyperKernel.h

TABLE 3

OSDisplay: The utility routine to display OSMonitor data

File: OSDisplay/osd.cc
Purpose: User interface to display OSMonitor data.
- Include File: OSMonitor.hh
- Include File: RTETypes.hh
- Include File: OSDisplay.hh
  Purpose: Linkage information for OSDisplay object.
- Include File: OS Monitor.hh File: OSDisplay/OSDisplay.cc
Purpose: Implementation of OSDisplay object.
- Include File: RTETypes.hh
- Include File: OSDisplay/Syscalls.hh
  Purpose: Table for translating IRIX system calls into character strings.
- Include File: OSDisplay.hh
- Include File: OS Monitor.hh

The invention claimed is:

1. A method for recording data that relate to the behavior of a digital multiprocessor when it executes at least one application program, wherein: (i) the digital multiprocessor supports an operating system; (ii) the digital multiprocessor comprises plural processor units, a respective buffer included in each processor, and a system clock accessible by each of said processors; and (iii) the application program includes jumps that are nominally made to the operating system, said jumps to be referred to as "OS calls," and the operating system includes returns that are nominally made back to the application program, the method comprising:

a) within each processor unit, enabling a program, to be referred to as the "hyperkernel," which is distinct from the operating system;

b) while the hyperkernel is enabled, operating each processor unit such that each jump nominally made to the operating system is intercepted by the hyperkernel, and such that each return nominally made back to the application program is intercepted by the hyperkernel;

c) under the control of the hyperkernel, recording each said intercepted jump as an OS call, reading the system clock, and then jumping to the operating system;

d) under the control of the hyperkernel, after each said return is intercepted; reading the system clock, recording event-timing data and process-ID data in the respective buffer of at least one processor unit, said data including entry and exit times of OS calls, and then returning to the application program;

e) sending the recorded data to a user interface device; and f) chronologically displaying activities of plural processor units relative to a common time base derived from readings of the system clock.

* * * * *